United States Patent [19]
Bergfeld et al.

[11] Patent Number: 5,543,511
[45] Date of Patent: Aug. 6, 1996

[54] PROCESS FOR THE PREPARATION OF LEVEL-OFF DP CELLULOSE

[75] Inventors: Manfred J. Bergfeld, Erlenbach-Mechenhard; Jürgen Seifert, Grosswallstadt, both of Germany

[73] Assignee: Akzo Nobel N.V., Netherlands

[21] Appl. No.: 354,788

[22] Filed: Dec. 12, 1994

[30]  Foreign Application Priority Data

Dec. 13, 1993 [DE] Germany .................. 43 42 442.2

[51] Int. Cl.⁶ .................................................. C08B 15/08
[52] U.S. Cl. ........................... 536/56; 536/124; 536/125; 536/126
[58] Field of Search ............................. 536/56, 124, 125, 536/126

[56]  References Cited

U.S. PATENT DOCUMENTS 3,012,914  12/1961  Battista et al. ............................. 536/56
3,278,519  10/1966  Battista et al. ............................. 536/56

FOREIGN PATENT DOCUMENTS 0248252  12/1987  European Pat. Off. .
245823A1  5/1987  Germany .
1796632A1  2/1993  U.S.S.R. .

*Primary Examiner*—Nathan M. Nutter
*Attorney, Agent, or Firm*—Oliff & Berridge

[57]  ABSTRACT

Level-off DP cellulose, which can be disaggregated in aqueous suspension with the application of mechanical force to give microcrystalline cellulose, is prepared by an environmentally friendly partial hydrolysis of cellulose in such a manner that the cellulose is subjected to partial hydrolysis in a pressurized reactor using water under a gas pressure of 0.1 to 60 bar of oxygen and/or carbon dioxide, measured at 20° C., at a temperature of 100° to 200° C. until the levelling-off DP has been reached. The partial hydrolysis is preferably carried out under a gas pressure of 0.5 to 30 bar, measured at 20° C., and in a temperature range from 140° to 180° C.

13 Claims, No Drawings

PROCESS FOR THE PREPARATION OF LEVEL-OFF DP CELLULOSE

BACKGROUND

Processes for the preparation of level-off DP cellulose have been disclosed, for example, in U.S. Pat. Nos. 2,978,446, 3,141,875 and 3,146,168. The term "level-off DP cellulose" which was coined by O.A. Battista in his essay "Hydrolysis and Crystallization of Cellulose, in Industrial and Engineering Chemistry", Vol. 42 (1950), 502–507, and which has generally been accepted in expert circles, comprises celluloses which have been subjected to partial hydrolysis under mild conditions and whose degree of polymerization, which correlates closely with the crystallite size of the starting celluloses, is termed LODP (levelling-off degree of polymerization) and is in a range of approximately 30–400.

The known processes for the preparation of level-off DP cellulose basically include partial hydrolysis of cellulose under conditions at which it is only the amorphous areas of these partially crystalline polysaccharides which are attacked, but these are dissolved completely. The partial hydrolysis is carried out, in these processes, in an acidic medium using aqueous solutions of sulphuric acid, $FeCl_3$ and, preferably, of hydrochloric acid, the degree of polymerization during this treatment dropping down to the LODP, which, depending on the origin of the starting cellulose, can vary substantially. The resulting level-off DP cellulose is removed from the acid- or salt-containing mother liquor by means of filtration and subjected to laborious washing procedures to achieve an acid- or salt-free product involving a large amount of water and, if appropriate, using alkaline solutions, since the purity requirements stipulated for pharmaceutical purposes are very stringent. A resuspension of the filter cake is followed by spray-drying, which gives the fine, flowable end product.

An important problem in the conventional processes is the large amount of polluted waste water. Characteristic of an already optimized process are the following amounts, which, however, are often exceeded by a factor of 2–3 under current practical conditions:

| | |
|---|---|
| Total amount of water required | 50 l/kg of level-off DP cellulose |
| NaCl obtained from the neutralized acid | 80 g/kg of level-off DP cellulose |
| Hemicellulose obtained | 60 g/kg of level-off DP cellulose |
| which corresponds to a COD of | 64 g/kg of level-off DP cellulose |

SUMMARY OF THE INVENTION

An object of the present invention is, therefore, to provide an environmentally friendly process for the preparation of level-off DP cellulose, by means of which the total amount of water required and hence the amount of waste water obtained per kg of level-off DP cellulose is drastically reduced and, in particular, the waste water obtained no longer contains inorganic salts. Another object of the present invention is to reduce the substantial amount of organic waste obtained and hence the COD (Chemical Oxygen Demand) value of the waste water resulting from the preparation process.

Surprisingly, it has been found that objects according to the invention can be achieved by a method in which, to prepare level-off DP cellulose, the cellulose is subjected to partial hydrolysis in a pressurized reactor using water under a gas pressure of 0.1 to 60 bar of oxygen and/or carbon dioxide measured at 20° C. at a temperature of 100° to 200° C., until the levelling-off DP has been reached. Oxygen in the sense of the invention is also understood as meaning gas mixtures with inert gases which contain at least 20% by weight of oxygen, for example, air. If inert gases are present, the total pressure of such gas mixtures which is to be applied must be increased accordingly due to the partial pressures of the inert gases in order to reach the intended oxygen gas pressure.

DESCRIPTION OF PREFERRED EMBODIMENTS

A preferred embodiment of the process according to the invention comprises carrying out the partial hydrolysis under a gas pressure of 0.5 to 30 bar, measured at 20° C. To achieve high reaction rates and good color values in the preparation of level-off DP cellulose, it is furthermore preferred that the partial hydrolysis is carried out in a temperature range from 140° to 180° C.

Suitable for the process according to the invention are, in principle, all purified celluloses which are prepared from the customary raw materials by conventional preparation processes. For example, the types of cellulose which can be used may have been produced from wood of coniferous trees, such as spruce, larch and pine, from woods of deciduous trees, such as beech, eucalyptus and birch, or from annual plants or other rapidly growing plants, such as cereal straw, bamboo and reed, by the sulphite pulping process, the sulphate pulping process or the nitric acid process for the production of cellulose. Alternatively, the purified celluloses may also have been obtained from cellulose-rich fibers, such as cotton, ramie, flax and hemp. Equally suitable are regenerated celluloses, such as rayon fibers and viscoses, and waste products of these. The LODP values which can be obtained by means of partial hydrolysis depend mainly on the choice of the above-mentioned raw materials. In the case of partially hydrolyzed cellulose types from woods of coniferous trees or deciduous leaves, from annual plants or from other rapidly growing plants, and in the case of partially hydrolyzed purified celluloses from cellulose-rich fibers, the LODP values are approximately from 200–400, while regenerated celluloses give much lower LODP values, for example between 30 and 100.

Even the non-combination-type use of the required gas pressures of oxygen or carbon dioxide allow the total amounts of water required in the preparation of level-off DP cellulose to be reduced by approximately 50%, i.e., from 50 l/kg, in the case of the conventional processes, to approximately 25 l/kg of level-off DP cellulose. Since the process according to the invention dispenses with the neutralization step and salts are no longer obtained as a byproduct, the resulting waste-waters are accordingly free from salts. The sole use of oxygen or carbon dioxide also results in a noticeable reduction in COD values compared with the processes of the prior art, i.e., from 64 g/kg to approximately 30 g/kg to 50 g/kg of level-off DP cellulose. Furthermore, the partial hydrolysis of the cellulose under the sole gas pressure of oxygen from approximately 5 bar gives level-off DP celluloses which are not only distinguished by a noticeably lighter color compared with the starting cellulose employed, but also give yields of more than 95%, i.e., yields above the typical yield level of the conventional processes (90–95%).

A particularly preferred embodiment of the process according to the invention consists in subjecting the cellulose to partial hydrolysis under a gas pressure of oxygen and carbon dioxide. In this case, the partial pressure of each type of gas is advantageously 30 to 70% of the total pressure. The combination of pure oxygen with carbon dioxide gives yields of level-off DP cellulose which exceed those from preparation processes of the prior art. While yields of 90–95% are typical for the latter, the combination according to the invention gives, generally, yields of 95–98%. In particular, however, the combination of oxygen and carbon dioxide generally results in COD values of only approximately 20 to 30 g/kg of level-off DP cellulose, so that the pollution of the waste-water resulting from the preparation process can also be reduced considerably with regard to the organic pollutants when compared with the conventional processes, independently of the fact that in this case too, inorganic salts are not added to the total amounts of water required in the process, which amounts are reduced by approximately 50% compared with the conventional processes, since neutralization is no longer necessary. Moreover, Elrepho color values of above 80 for the end product can be achieved within the combination if an oxygen partial pressure from 2.5 bar is used, so that resulting level-off DP celluloses show a much lighter color in comparison with the starting cellulose employed in each case.

In general, partial hydrolysis of the cellulose is carried out in conventional pressurized reactors which are equipped with a stirrer, for example, a propeller stirrer, or another type of stirrer conventionally used in the cellulose-processing industry. The starting cellulose used is first chopped into chips, for example, 5×5×1 millimeter in size, and excess water together with the chips is used to form an aqueous reaction liquor which, under the reaction conditions, is soon in the form of a fiber suspension (pulp). The cellulose:liquor volume ratio can be varied within a wide range and can generally be from 1:3 to 1:40. As a rule, a cellulose:liquor volume ratio from 1:8 to 1:20 is preferred for the process according to the invention. The reactor is usually filled with the aqueous reaction liquor to a degree of 50 to 90% of its nominal volume.

The pressurized reactor can be operated as a closed system so that the process according to the invention is, in this case, carried out batchwise. Since the gas used in the reaction is virtually unconsumed chemically, virtually all of it can be recirculated for subsequent batches. Alternatively, it is also possible to keep constant all flow operations with regard to quantity and quality and to operate the pressurized reactor fully continuously with the reaction conditions remaining constant over time. It is preferred within the scope of the invention for the reaction to be carried out in a continuously operated pressurized reactor.

Analogously to level-off DP celluloses which have been produced by conventional processes, for example, using strong mineral acids, the level-off DP cellulose obtained by the process according to the invention meets all requirements for pharmaceutical purposes and can therefore be employed, in particular, as an auxiliary for the production of tablets, as a stabilizer for suspensions or heat-stable O/W emulsions and in the food sector. If particle sizes of around 1 μm or below are desired for certain purposes, it is advantageous to disaggregate the level-off DP cellulose in aqueous suspension in a known manner with the application of mechanical force to give microcrystalline cellulose.

In the examples below, the oxygen or the carbon dioxide or the combination of the two gases is injected at room temperature after the pressurized reactor is filled with liquor and then sealed, and, if the pressure drops, for example, by gas dissolving in the liquid, more gas is injected until the desired gas pressure values in the gas phase remains stationary. Accordingly, the gas pressures required always relate to the measuring temperature of 20° C. Finally, the reactor is brought to the reaction temperature by means of heat-transfer oil by means of its double jacket, always using approximately identical heating times, and the moment when the intended temperature is reached is considered as the beginning of the reaction time.

The following parameters are determined analytically on the level-off DP cellulose during the course of the process:

The yield is determined as the quotient of the two values: weighed cellulose/weighed reaction product, multiplied by 100%, in each case using materials which are previously oven-dried under vacuum conditions.

The average degree of polymerization (=DP) is determined in agreement with DIN 54 270, parts 1 and 2.

The COD determination is carried out in agreement with DIN 38 409: "Deutsches Einheitsverfahren fur Wasser/ Abwasser und Flammpunktsverfahren (German standard process for water/waste water and flashpoint methods)".

The Elrepho color value is determined using an apparatus manufactured by Zeiss, Oberkochen, "Elrepho" type, by a means of measuring the degree of remission of the pulverulent sample with $BaSO_4$ as a comparison substance, using filter R46. The measurement is carried out as described in DIN 53145.

The number of carboxyl groups ($n_{COOH}$), which can be regarded as a measurement for the oxidative damage to the cellulose, is determined by means of titrimetry using 0.1N NaOH of a sample which has previously been treated with 1N HCl and subsequently washed with fully demineralized water until neutral.

The relative crystallization characteristic ($X_R$) is determined similarly to the method of P. H. Hermans and A. Weldinger (19 J. Appl. Phys. 491 (1948) or 4 J. Polym. Sci. 135 (1949)). "Relative" in this context means that the numbers are comparable with regard to their relative deviation but do not represent absolute values. However, all of them differ merely by a constant factor from the corresponding absolute values (which would be determinable, for example, by a calibration series using substances of known, absolute crystallinity).

The invention is illustrated in greater detail with the aid of the examples which follow:

EXAMPLE 1

The starting cellulose employed is a commercially available chemical pulp which is prepared from northern spruce by the sulphite method and has an α-cellulose content of 92.2%, a DP of 1400, an Elrepho color value of 79.4 and an $X_R$ value of 0.66 as well as a COOH value of 20 mmol/kg. The pressurized reactor used is a 1 l laboratory-scale pressurized apparatus manufactured by BUCHI and equipped with a stirrer. The reaction liquor is formed by the sheet-like cellulose cut into chips approximately 5×5×1 mm in size, in an excess of water, and the cellulose:liquor volume ratio is 1:19. The reactor is filled with this reaction liquor to approximately 50% of its nominal volume. After the pressurized reactor is sealed, 0.5 bar of carbon dioxide is injected at 20° C. The pressurized reactor is then brought to the reaction temperature of 160° C. by means of a double jacket using heat-transfer oil, and the point when this temperature is reached is considered as the beginning of the reaction time, which is 5 hours in the present case. After the reaction time elapses, the pressurized reactor is cooled to approximately 80° C. in the course of approximately 60 minutes, the gas is discharged and the reactor then opened.

The reaction product is filtered off on a frit, and the filter cake is washed on the frit using approximately 5 l of deionized water per kg of dry level-off DP cellulose. In the wet state, the filter cake has the pasty, "loam-like" consistency which is characteristic of level-off DP cellulose. The COD values of the filtrate are measured, and the data obtained in mg/l are converted into g/kg of level-off DP cellulose obtained.

After drying overnight at 60° C. and 20 mbar, the filter cake, which is in the form of a hard, brittle block, is ground in a laboratory mill to give a fine, flowable product. The color value, DP and relative crystallization characteristic ($X_R$) of this product are subsequently determined. The properties of the level-off DP cellulose obtained, the yield and the COD value are as follows:

| Yield: | 97.1% | COD (g/kg of end product): | 28.1 |
|---|---|---|---|
| DP: | 295 | Elrepho color value: | 78.8 |
| $X_R$: | 0.69. | | |

EXAMPLE 2

Example 1 is repeated, but the partial hydrolysis is carried out in this case under a carbon dioxide gas pressure of 5.0 bar. The properties of the level-off DP cellulose obtained, the yield and the COD value in g/kg of level-off DP cellulose are as follows:

| Yield: | 97.0% | COD (g/kg of end product): | 48.5 |
|---|---|---|---|
| DP: | 302 | Elrepho color value: | 78.2 |
| $X_R$: | 0.71. | | |

EXAMPLE 3

Example 1 is repeated, but the partial hydrolysis is carried out in this case under a carbon dioxide gas pressure of 10.0 bar. The properties of the level-off DP cellulose obtained, the yield, the COD value in g/kg of level-off DP cellulose and the carboxyl value are as follows:

| Yield: | 94.8% | COD (g/kg of end product): | 36.7 |
|---|---|---|---|
| DP: | 318 | Elrepho color value: | 78.5 |
| $X_R$: | 0.70 | $n_{COOH}$: | 12 mmol/kg. |

EXAMPLE 4

Example 1 is repeated with several modifications, so that the reaction temperature is 160° C. and the reaction time 2 hours. The partial hydrolysis, or the reduction of the average degree of polymerization, is furthermore carried out under an oxygen gas pressure of 2.5 bar. The properties of the level-off DP cellulose obtained, the yield and the COD value in g/kg of level-off DP cellulose are as follows:

| Yield: | 92.7% | COD (g/kg of end product): | 31.9 |
|---|---|---|---|
| DP: | 303 | Elrepho color value: | 79.2 |
| $X_R$: | 0.71. | | |

EXAMPLE 5

Example 4 is repeated, but the reduction of the average degree of polymerization is carried out under an oxygen gas pressure of 5.0 bar. The properties of the level-off DP cellulose obtained, the yield and the COD value in g/kg of level-off DP cellulose are as follows:

| Yield: | 95.9% | COD (g/kg of end product): | 30.5 |
|---|---|---|---|
| DP: | 313 | Elrepho color value: | 82.9 |
| $X_R$: | 0.71. | | |

EXAMPLE 6

Example 4 is repeated, but the partial hydrolysis is carried out in this case under a oxygen gas pressure of 10.0 bar. The properties of the level-off DP cellulose obtained, the yield and the COD value in g/kg of level-off DP cellulose are as follows:

| Yield: | 97.0% | COD (g/kg of end product): | 29.4 |
|---|---|---|---|
| DP: | 305 | Elrepho color value: | 83.4 |
| $X_R$: | 0.71. | | |

EXAMPLE 7

In this example, the partial hydrolysis of cellulose Temalfa 93 is carried out analogously to Example 4 using a combination of oxygen and carbon dioxide. The reaction temperature is, therefore, 160° C. and the reaction time 2 hours. The partial pressure of both the oxygen and the carbon dioxide is 2.5 bar. The experiment is otherwise carried out as in Example 1. The properties of the level-off DP cellulose obtained, the yield, the COD value in g/kg of level-off DP cellulose and the COOH value are as follows:

| Yield: | 98.2% | COD (g/kg of end product): | 28.5 |
|---|---|---|---|
| DP: | 318 | Elrepho color value: | 80.8 |
| $X_R$: | 0.72 | $n_{COOH}$: | 13 mmol/kg. |

EXAMPLE 8

Example 7 is repeated, but the partial pressure of the oxygen and of the carbon dioxide is 5.0 bar in each case. The properties of the level-off DP cellulose obtained, the yield, the COD value in g/kg of level-off DP cellulose and the COOH value are as follows:

| Yield: | 96.1% | COD (g/kg of end product): | 20.9 |
|---|---|---|---|
| DP: | 312 | Elrepho color value: | 81.6 |
| $X_R$: | 0.72 | $n_{COOH}$: | 14 mmol/kg. |

EXAMPLE 9

Example 7 is repeated, but the partial pressure of the oxygen and of the carbon dioxide is 10.0 bar in each case. The properties of the level-off DP cellulose obtained, the yield and the COD value in g/kg of level-off DP cellulose are as follows:

| Yield: | 95.3% | COD (g/kg of end product): | 30.1 |
|---|---|---|---|
| DP: | 308 | Elrepho color value: | 84.1 |
| $X_R$: | 0.71. | | |

EXAMPLE 10

In this example, the partial hydrolysis of the cellulose is carried out in a 3 l BUCHI laboratory-scale stirred autoclave at a reaction temperature of 180° C. and over a reaction time of 15 minutes using a combination of oxygen and carbon dioxide. The partial pressure of both the oxygen and the carbon dioxide is 2.5 bar measured at 20° C., and the total pressure at the reaction temperature of 180° C. is 20.6 bar. The experiment is otherwise carried out as in Example 1. The properties of the leveloff DP cellulose obtained, the yield, the COD value in g/kg of level-off DP cellulose and the COOH value are as follows:

| Yield: | 95.4% | COD (g/kg of end product): | 31.4 |
|---|---|---|---|
| DP: | 315 | Elrepho color value: | 83.1 |
| $X_R$: | 0.69 | $n_{COOH}$: | 12 mmol/kg. |

EXAMPLE 11

Example 10 is repeated, but the partial hydrolysis is carried out in this case under an oxygen gas pressure of 5.0 bar measured at 20° C. and with a cellulose:liquor volume ratio of 1:10. The total pressure at the reaction temperature of 180° C. is 17.9 bar during a reaction time of 15 minutes. The properties of the level-off DP cellulose obtained, the yield and the COD value in g/kg of level-off DP cellulose are as follows:

| Yield: | 95.8% | COD (g/kg of end product): | 43.8 |
|---|---|---|---|
| DP: | 308 | Elrepho color value: | 81.3 |
| $X_R$: | 0.70. | | |

EXAMPLE 12

In a technical laboratory experiment, the partial hydrolysis of the cellulose is carried out on a 100 l scale at a cellulose:liquor volume ratio of 1:19 under an oxygen gas pressure of 5.0 bar, measured, as always, at 20° C. The reactor used in this case is a 150 l pressurized titanium autoclave manufactured by Friedrichsfeld, equipped with an inclined-blade stirrer. Again, the autoclave is heated by means of a double jacket using heat-transfer oil. The reaction temperature is 180° C., the total pressure at this temperature 17.0 bar and the reaction time 0.5 hour.

After the reaction product obtained is subjected to centrifuge washing using 5 l of water/kg of product, it is spray-dried and subjected to a specification test as described in US Pharmacopeia for microcrystalline cellulose for pharmaceutical purposes. The results obtained are shown in Table 1 along with data for the established, commercially available product Avicel PH 101, which is manufactured by FMC Corporation of Philadelphia.

TABLE 1

Specification test for level-off DP celluloses. Specifications in accordance with US Pharmacopeia XXI, NF XVI, p. 1546.

| Specification | Commercially available comparison substance (Avicel PH 101) | Sample obtained by process according to the invention (Example 12) |
|---|---|---|
| Particle sizes | 0.0% | 0.2% |
| <1% 250 μm | 9.9% | 16.2% |
| <30% 75 μm | 45.1 | 47.6 |

TABLE 1-continued

Specification test for level-off DP celluloses. Specifications in accordance with US Pharmacopeia XXI, NF XVI, p. 1546.

| Specification | Commercially available comparison substance (Avicel PH 101) | Sample obtained by process according to the invention (Example 12) |
|---|---|---|
| Average diameter [μm]• Water | | |
| <6% by weight | 4.5% | 4.7% |
| pH | 6.1 | 5.5 |
| 5.5–7.0 | | |
| Water-soluble components | 0.13% | 0.07% |
| <0.16% by weight | | |
| Ether-soluble components | 0.005% | 0.003% |
| <0.05% by weight | | |
| Starch | + | + |
| Not detectable | | |
| Sedimentation | + | + |
| Not observed over 3 hours | | |
| Ash | 0.05 | 0.03 |
| <0.1% by weight | | |
| Elrepho degree of whiteness• | 78.8 | 82.6 |
| Chloride [ppm]• | 140 | 76 |
| DP• | 283 ± 10 | 295 ±10 |

+ = meets specification
*no specification in accordance with US Pharmacopeia, but important comparison parameter Accordingly, the product obtained in Example 12 can be considered as superior to the comparison product in some aspects. The remaining properties of the level-off DP cellulose obtained are as follows:

| Yield: | 95.3% | COD (g/kg of end product): | 41.6 |
|---|---|---|---|
| DP: | 295 | Elrepho color value: | 82.6 |
| $X_R$: | 0.73. | | |

What is claimed is:

1. A process for the preparation of level-off DP cellulose, comprising partially hydrolyzing semi-crystalline cellulose only where said semi-crystalline cellulose is amorphous, said partial hydrolysis comprising:

combining said semi-crystalline cellulose with water to form a reaction liquor;

adjusting and maintaining said reaction liquor at a reaction temperature of 100° to 200° C.;

adding to said reaction liquor at least one gas selected from the group consisting of carbon dioxide and oxygen, in an amount sufficient to adjust and maintain said reaction liquor at a total gas pressure of 0.1 to 60 bar, as measured at 20° C.; and partially hydrolyzing said semi-crystalline cellulose in said reaction liquor until the levelling-off degree of polymerization is reached, thereby yielding level-off DP cellulose.

2. The process according to claim 1, wherein said total gas pressure is 0.5 to 30 bar, as measured at 20° C.

3. The process according to claim 1, wherein said reaction temperature is 140° to 180° C.

4. The process according to claim 1, wherein both said carbon dioxide and said oxygen are added to said reaction liquor.

5. The process according to claim 4, wherein a partial gas pressure for each of said carbon dioxide and said oxygen is 30 to 70% of said total gas pressure.

6. The process according to claim 1, wherein said semi-crystalline cellulose is provided in said reaction liquor at a cellulose:liquor volume ratio of 1:3 to 1:40.

7. The process according to claim 6, wherein said cellulose:liquor volume ratio is 1:8 to 1:20.

8. The process according to claim 1, further comprising conducting said partial hydrolysis in a pressurized reactor, wherein said reaction liquor occupies 50 to 90% of a nominal volume of said reactor.

9. The process according to claim 8, wherein said reactor continuously conducts said partial hydrolysis.

10. The process according to claim 1, further comprising applying a mechanical force to an aqueous suspension of level-off DP cellulose, thereby disaggregating said level-off DP cellulose to yield microcrystalline cellulose.

11. The process according to claim 1, wherein at least some of said oxygen is provided in a form of a mixture with at least one inert gas, said mixture comprising at least 20 wt. % oxygen.

12. The process according to claim 11, wherein said total gas pressure is adjusted by an amount sufficient to adjust a partial gas pressure for said at least one gas selected from the group consisting of carbon dioxide and oxygen to 30 to 70% of said total gas pressure.

13. The process according to claim 11, wherein said total gas pressure is increased by an amount about equal to a partial gas pressure of said at least one inert gas.

* * * * *